United States Patent [19]
Wright

[11] Patent Number: 5,738,692
[45] Date of Patent: Apr. 14, 1998

[54] FUEL TREATMENT DEVICE

[75] Inventor: Ralph H. Wright, Winchester, United Kingdom

[73] Assignee: Advanced Power Systems International, Inc., Kent, Conn.

[21] Appl. No.: 757,612

[22] Filed: Nov. 29, 1996

Related U.S. Application Data

[63] Continuation-in-part of Ser. No. 528,363, May 25, 1990, Pat. No. 5,580,359.

[30] Foreign Application Priority Data

May 26, 1989 [GB] United Kingdom ............... 8912592

[51] Int. Cl.$^6$ ............... F02M 27/02; F02B 51/02; C22C 13/02
[52] U.S. Cl. ............... 44/321; 123/538; 123/670; 420/559
[58] Field of Search ............... 123/538, 670; 44/321; 420/559

[56] References Cited

U.S. PATENT DOCUMENTS

| | | | |
|---|---|---|---|
| 3,507,789 | 4/1970 | Heilweil et al. | 44/321 |
| 3,635,200 | 1/1972 | Rundell et al. | 123/3 |
| 3,855,980 | 12/1974 | Weisz et al. | 123/3 |
| 3,897,225 | 7/1975 | Henkel et al. | 48/107 |
| 3,944,697 | 3/1976 | Burke | 44/321 |
| 4,046,522 | 9/1977 | Chen et al. | 48/102 A |
| 4,429,665 | 2/1984 | Brown | 123/538 |
| 4,517,926 | 5/1985 | Reinhard et al. | 44/321 |
| 4,858,582 | 8/1989 | Brown | 123/523 |
| 4,862,836 | 9/1989 | Chen et al. | 123/3 |
| 4,884,531 | 12/1989 | Degnan, Jr. et al. | 123/3 |
| 4,891,050 | 1/1990 | Bowers et al. | 44/361 |
| 4,892,562 | 1/1990 | Bowers et al. | 44/342 |
| 5,249,552 | 10/1993 | Brooks | 123/538 |
| 5,580,359 | 12/1996 | Wright | 44/321 |

FOREIGN PATENT DOCUMENTS

| | | |
|---|---|---|
| 459592 | 9/1949 | Canada . |
| 2500683 | 7/1976 | Germany . |
| 1079689 | 8/1967 | United Kingdom . |
| 9014516 | 11/1990 | WIPO . |

*Primary Examiner*—Jerry D. Johnson
*Attorney, Agent, or Firm*—Rossi & Associates

[57] ABSTRACT

A fuel treatment device treats fuel prior to combustion in order to improve combustion efficiency and reduce exhaust emissions in hydrocarbon fuel burning systems. The fuel treatment device includes at least one element comprising tin, antimony, lead and mercury that is brought in contact with fuel to be treated. The element comprises the following percentages by weight: 60–80% tin; 15–30% antimony; 2–7% lead; and 3–12% mercury. In a further preferred embodiment, the element comprises the following percentages by weight: 70–75% tin; 15–30% antimony; 2–7% lead; and 3–12% mercury. In a still further preferred embodiment, the element comprises an alloy including approximately 75% wt tin, 21% wt antimony and 4% wt lead, wherein 0.5 kg of mercury and 0.020 kg platinum is added to 5.0 kg of the alloy. The fuel is treated as it comes into contact with the element.

20 Claims, 14 Drawing Sheets

FUEL TREATMENT DEVICE

CROSS REFERENCE TO RELATED APPLICATIONS

This application is a continuation-in-part application of U.S. patent application Ser. No. 07/528,363 filed on May 25, 1990, now U.S. Pat. No. 5,580,359 the contents of which are herein incorporated.

FIELD OF THE INVENTION

The present invention relates in general to devices for treating fuels prior to combustion in order to increase combustion efficiency and thereby reduce exhaust emissions. More specifically, the invention relates to a fuel treatment device that is preferably located in a fuel line or within a fuel tank to treat fuel just prior to combustion.

BACKGROUND OF THE INVENTION

It has long been an objective of many individuals within different industries to develop devices and methods for improving the combustion efficiency of hydrocarbon fuel burning systems. U.S. Pat. No. 4,862,836 issued to Chen et al., for example, discusses the use of a pre-engine converter including an aluminosilicate zeolite catalyst for treating hydrocarbon fuels prior to combustion in an internal combustion engine. The concept of utilizing a catalyst to crack long chain liquid hydrocarbons prior to combustion has been studied in depth, as further evidenced by U.S. Pat. No. 5,074,273 and U.S. Pat. No. 5,092,303 issued to Brown, which discuss the use of a platinum catalyst in fuel preconditioners for internal combustion engines. To date, however, a practical and proven device for treating fuel, which can be successfully implemented in commercial production, has been lacking.

SUMMARY OF THE INVENTION

The invention provides a fuel treatment device for treating fuel prior to combustion in order to improve combustion efficiency and reduce exhaust emissions in hydrocarbon fuel burning systems. More specifically, the fuel treatment device includes a catalyst element comprising tin, antimony, lead and mercury that is brought in contact with fuel to be treated. The catalyst element comprises the following percentages by weight: 60–80% tin; 15–30% antimony; 2–7% lead; and 3–12% mercury. In a further preferred embodiment, the catalyst element comprises the following percentages by weight: 70–75% tin; 15–30% antimony; 2–7% lead; and 3–12% mercury. In a still further preferred embodiment, the catalyst element comprises an alloy including approximately 75% wt tin, 21% wt antimony and 4% wt lead, wherein 0.5 kg of mercury and 0.020 kg platinum is added to 5.0 kg of the alloy. At least one element is preferably contained within an in-line housing or a drop-in housing through which fuel passes. The fuel comes into contact with the element and is treated as it passes through the housing.

In one embodiment, a catalyst element including a composition of 70 to 75% wt tin, 15 to 25% wt antimony, 2 to 4% wt lead and 3 to 7% wt mercury is manufactured by:

A) melting the tin, antimony and lead together in a mild steel pot to approximately 50 degrees Celsius above the melting temperature and stirring the resultant material for at least about three minutes using a mild steel rod or bar;

B) adding mercury, increasing the temperature a further 50 to 100 degrees Celsius, and continuing stirring for at least about two minutes after the upper temperature is reached; and C) pouring the molten material, by use of a mild or stainless steel ladle, into mild steel molds pre-heated to a temperature sufficient to keep the mass molten for at least about one second after pouring.

The fuel treatment device in accordance with the invention improves fuel combustion in hydrocarbon fuel burning systems, thereby reducing exhaust emissions and improving fuel economy. Other advantages and features of the invention will become apparent from the following detailed description of the preferred embodiments of the invention.

BRIEF DESCRIPTION OF THE DRAWINGS

The invention will be described in detail with reference to certain preferred embodiments thereof and the accompanying drawings, wherein.

DETAILED DESCRIPTION OF THE INVENTION

Figure 1:
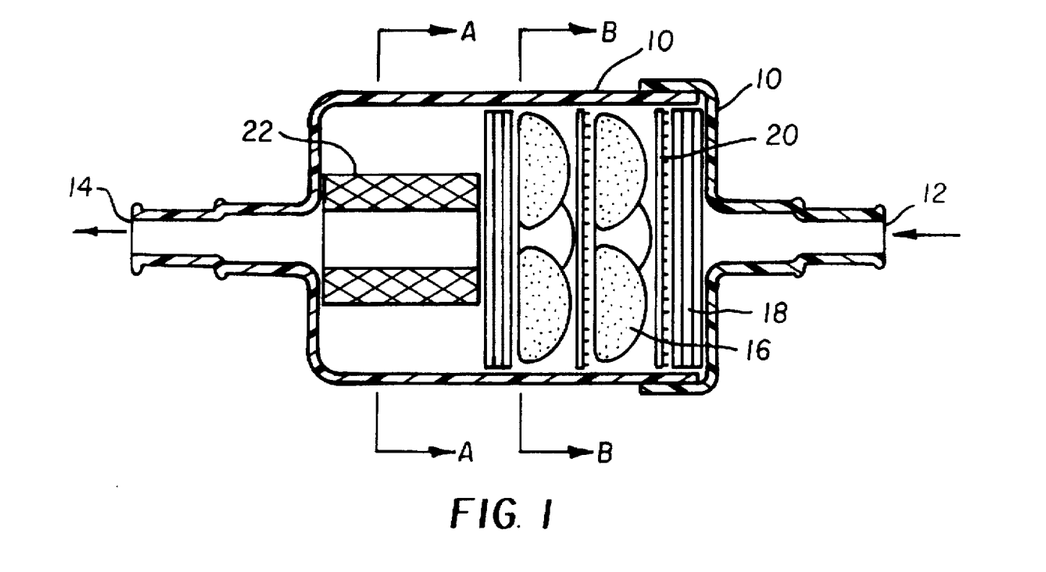
FIG. 1 is a longitudinal section through a fuel treatment device in accordance with a first embodiment of the invention.
Figure 2:
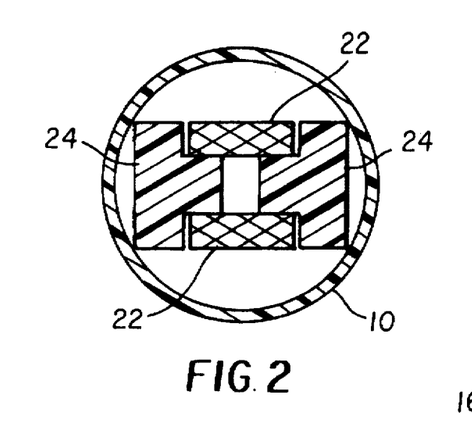
FIG. 2 is a cross-sectional view through the device of FIG. 1 taken along line A—A.
Figure 3:
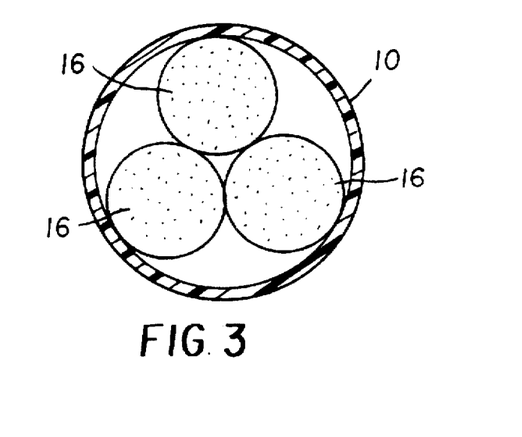
FIG. 3 is a cross-sectional view through the device of FIG. 2 taken along line B—B.

A fuel treatment device in accordance with a first embodiment of the invention is illustrated in FIG. 1 as comprising a cylindrical two-part in-line housing or container 10 including a fuel flow inlet 12 and a fuel flow outlet 14. The container 10 is preferably manufactured from a plastic material, although other materials including metals, composites and other synthetics may be readily employed. A plurality of cones or elements 16 manufactured from a catalyst material are located within the container 10. In the illustrated embodiment, the elements 16 are arranged in two sets of three elements (See FIG. 3) that are located between element spacers 18 and mild steel mesh disks 20. The element spacers 18 are preferably plastic disks with perforations that permit, as with the steel mesh disks 20, the passage of fuel from the fuel flow inlet 12 to the fuel flow outlet 14, during which the fuel comes into contact with the elements 16. If desired, a pair of ferrite permanent magnets 22 can also be held in parallel by magnetic spacers 24 adjacent to the fuel flow outlet 14, as shown in FIG. 2, to induce a magnetic field or electrostatic charge on the treated fuel. It has been found, however, that the use of the magnets 22 is not required to obtain useful results in combustion efficiency and may be deleted.

The elements 16 preferably include, apart from impurities, 60 to 80% wt tin, 15 to 30% wt antimony, 2 to 7% wt lead, and 3 to 12% wt mercury, and may be formed by casting, extruding, cutting or shaping to have any desired configuration. In the illustrated embodiment, the elements 16 have a base diameter of approximately 20 mm. Although six elements are illustrated, the particular number required naturally depends upon the desired application and implementation of the fuel treatment device. Further, altering the number of elements 16 will naturally change the number of element spacers 18 and steel mesh disks 20 employed in the device. Although the complete nature of the interaction between the fuel and the elements is not presently understood, it is believed that a catalytic reaction takes place between the fuel and the elements 16 as the fuel passes through the container 10, thereby improving the combustion of the fuel when burned, for example, in an internal combustion engine, a boiler or furnace.

In a further preferred embodiment, the elements 16 are composed of a composition of 70 to 75% wt tin, 15 to 25% wt antimony, 2 to 4% wt lead and 3 to 7% wt mercury and are manufactured by the following method:

A) The tin, antimony and lead are melted together in a mild steel pot to approximately 50 degrees Celsius above the melting temperature and the resultant material is stirred for three to four minutes-using a mild steel rod or bar.

B) The mercury is added, the temperature is increased a further 50 to 100 degrees Celsius, and the resultant material is stirred for a further two minutes.

C) The molten material is poured, by use of a mild or stainless steel ladle, into molds (of the desired element shape) in a mold block, which is formed of mild steel and is pre-heated to a temperature sufficient to prevent the material from solidifying in less than one second after pouring.

It should be noted that mis-cast elements, or any of the formulation allowed to solidify in the melting pot, may be re-melted and re-cast provided that the total time lapse after the addition of the mercury does not exceed 45 minutes.

In a still further embodiment, the elements 16 may be made from an alloy that is approximately 75% wt tin, 21% wt antimony and 4% wt lead, wherein 0.5 kg of mercury and 0.020 kg platinum is added to 5.0 kg of the alloy.

Figure 4:
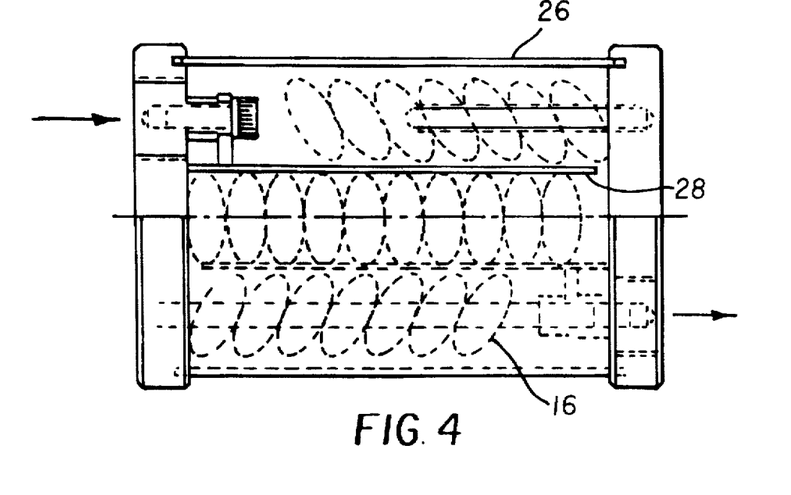
FIG. 4 is a longitudinal section through a fuel treatment device in accordance with a second embodiment of the invention.
Figure 5:
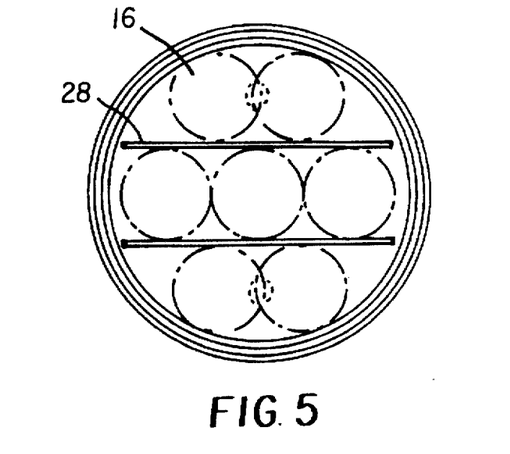
FIG. 5 is an end view of the device illustrated in FIG. 4 with an end cap removed.
Figure 6:
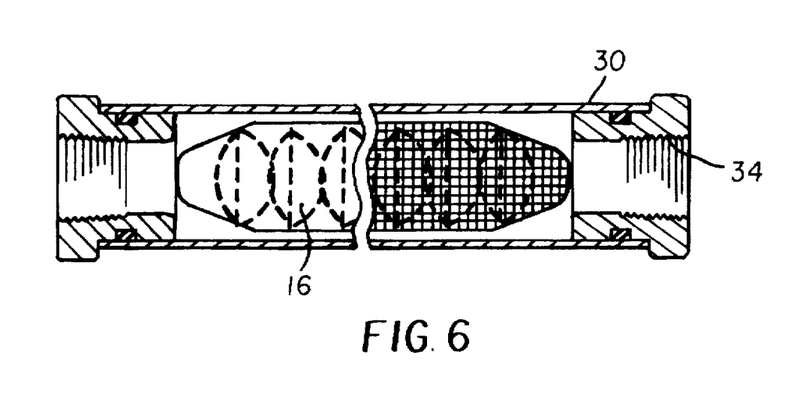
FIG. 6 is a longitudinal section through a fuel treatment device in accordance with a third embodiment of the invention.
Figure 7:
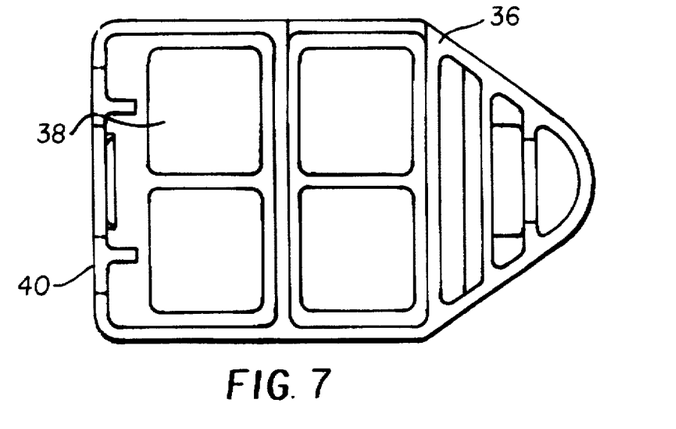
FIG. 7 is a top sectional view of a fuel treatment device in accordance with a fourth embodiment of the invention.
Figure 8:
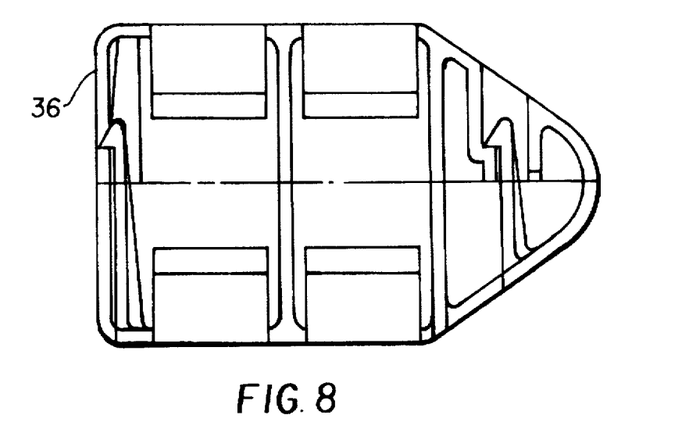
FIG. 8 is a side sectional view of the fuel treatment device of FIG. 7.
Figure 9:
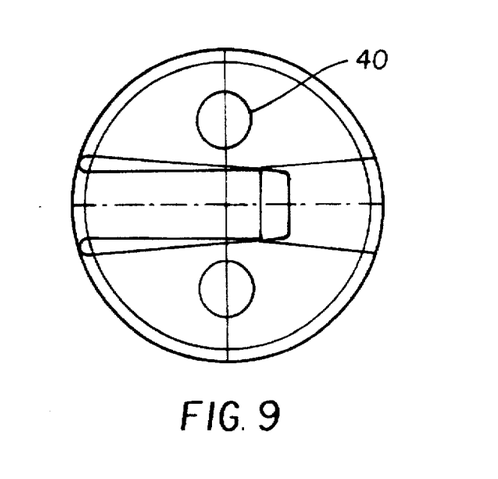
FIG. 9 is an end view of the fuel treatment device illustrated in FIGS. 7 and 8.

Many variations in the structure of the housing or container used to contain the elements 16 are possible. FIGS. 4 and 5, for example, illustrate a further embodiment of an in-line housing 26 in which a plurality of elements 16 are separated into three levels by steel screens or separators 28. Further, FIG. 6 illustrates an in-line housing 30 wherein a plurality of elements 16 are retained within steel screen mesh retainer 32 located in the cylindrical housing 30 having threaded end caps 34. Still further, FIGS. 7–9 illustrate a drop-in housing or cage 36 comprising a snap-fit plastic container in which a plurality of elements 16 can be retained. Holes 38, 40 are provided in the housing 36 to permit fuel to pass through the housing 36 and contact the elements 16. The drop-in housing 36 is dropped into a fuel tank in order to treat fuel, and is particularly useful for small engine applications including, for example, lawn maintenance equipment. When the drop-in housing 36 is utilized in plastic fuel tanks, it is preferable that the housing be made of steel or that steel screens be used to retain the elements.

Although the exact mechanism for how the elements or elements 16 react with the fuel is not yet completely understood, testing conducted by the Advanced Propulsion Technology Center, Oak Ridge National Laboratory confirmed that treatment of fuel with the elements 16 changed the composition of fuel, in the direction of higher octane, higher energy fuel constituents, for gasoline, Indolene and diesel. The method of analysis chosen was gas chromatography followed by mass spectrometric detection (GC/MS). GC/MS is capable of determining the chemical composition of complex mixtures of organic compounds such as fuels. Testing was conducted using catalyst packs containing 3.5 inch diameter elements, of the type described above, in a polyethylene cage. Two 250 ml samples each of diesel fuel, gasoline (unleaded, 87 octane), and Indolene (a research gasoline) were placed in pre-cleaned, amber glass bottles fitted with Teflon™ lined caps. An element pack was placed in one jar of each type of fuel, shaken for one minute, and left to stand for 12 hours. A 25 ml aliquot of each fuel, treated and untreated was then taken and put into pre-cleaned 40 ml headspace sampling vials and provided for GC/MS analysis.

The GC/MS analysis consisted of a 0.5 ml sample from the headspace of each vial (i.e. a sample of the vapors above the fuel in the vial). A splitless injection was made of each sample onto a 60 m DB-624 capillary column, cryogenically cooled inside a Hewlett-Packard (HP) 5890 Series 11 GC to 0 degrees Celsius. The GC run conditions were 0 Celsius for 10 min., then 0–250 Celsius at 3 C./min. which resulted in excellent separation of the components. Detection was accomplished with an HP 5971 MSD, controlled by HP Chemstation software. The six reconstructed ion chromatograms for the treated and untreated gasoline, Indolene, and diesel fuels, respectively, are shown in FIGS. 10–15.

Figure 10:
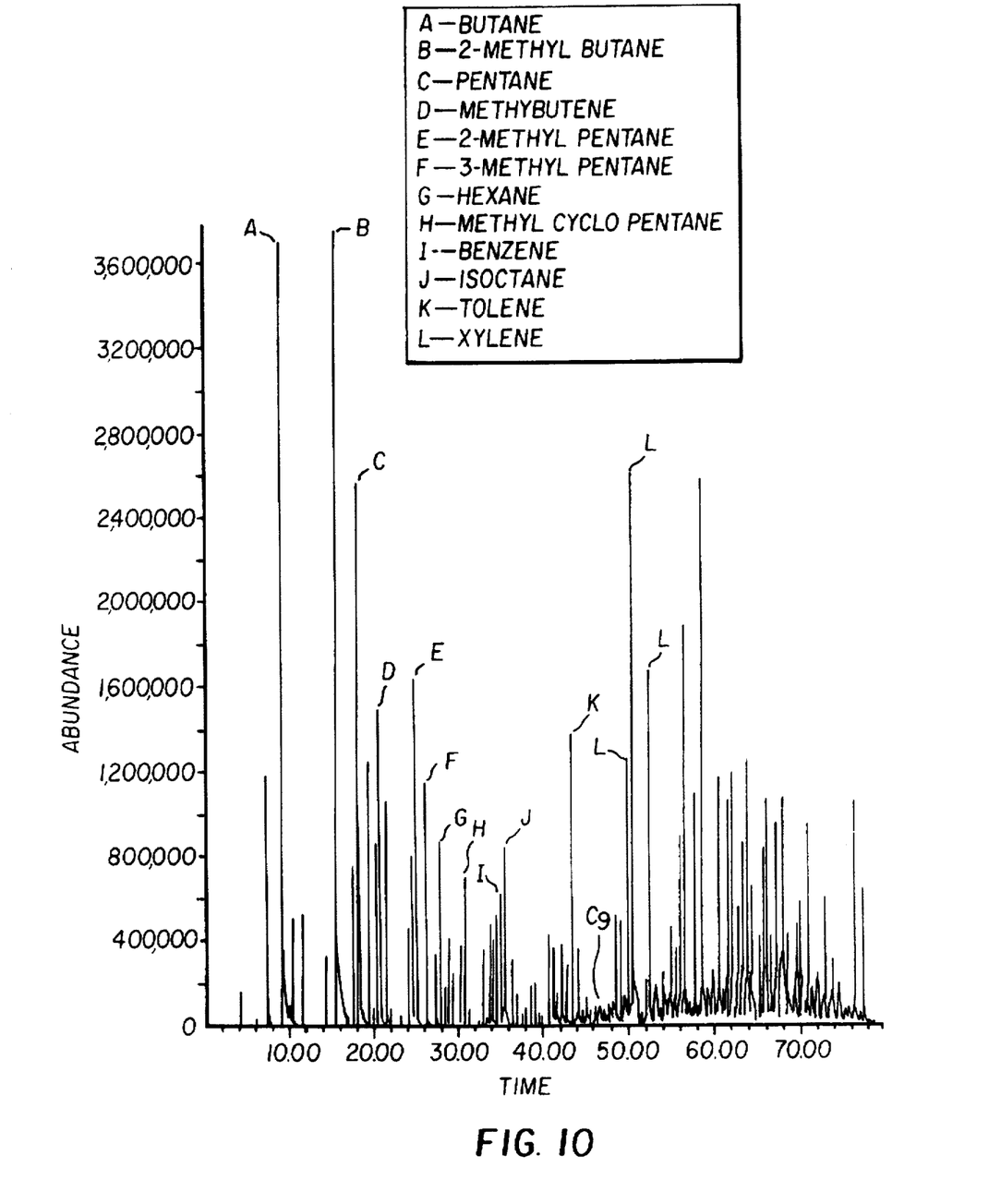
FIG. 10 is an ion chromatogram illustrating gasoline treated with catalyst elements in accordance with the invention.

Detailed data analysis was performed using the Chemstation software. The results of these experiments show major changes occurred in the fuel samples. Cursory comparison of the untreated and treated fuels in FIG. 10–15 show that the elements changed the amounts of individual components in the fuel samples by large amounts. For instance, FIG. 10, the treated gasoline, shows many more large peaks eluting between 40 and 80 minutes of the run, in comparison to FIG. 11, the untreated gasoline. It should be noted that concentration is proportional to peak height in the figures. When peaks could be identified, based on their mass spectrum, their identity has been indicated next to the peak. As an example, the three peaks in FIG. 11 between 50 and 51.2 minutes are identified as the three isomers of xylene. The peaks range in height from about 200,000 to 500,000 units. In FIG. 10, the same isomers of xylene range in height from 1,200,000 to 2,500,000, an increase of approximately fivefold in concentration. Similar changes in peak height are observed for the diesel fuel and the Indolene.

Figure 11:
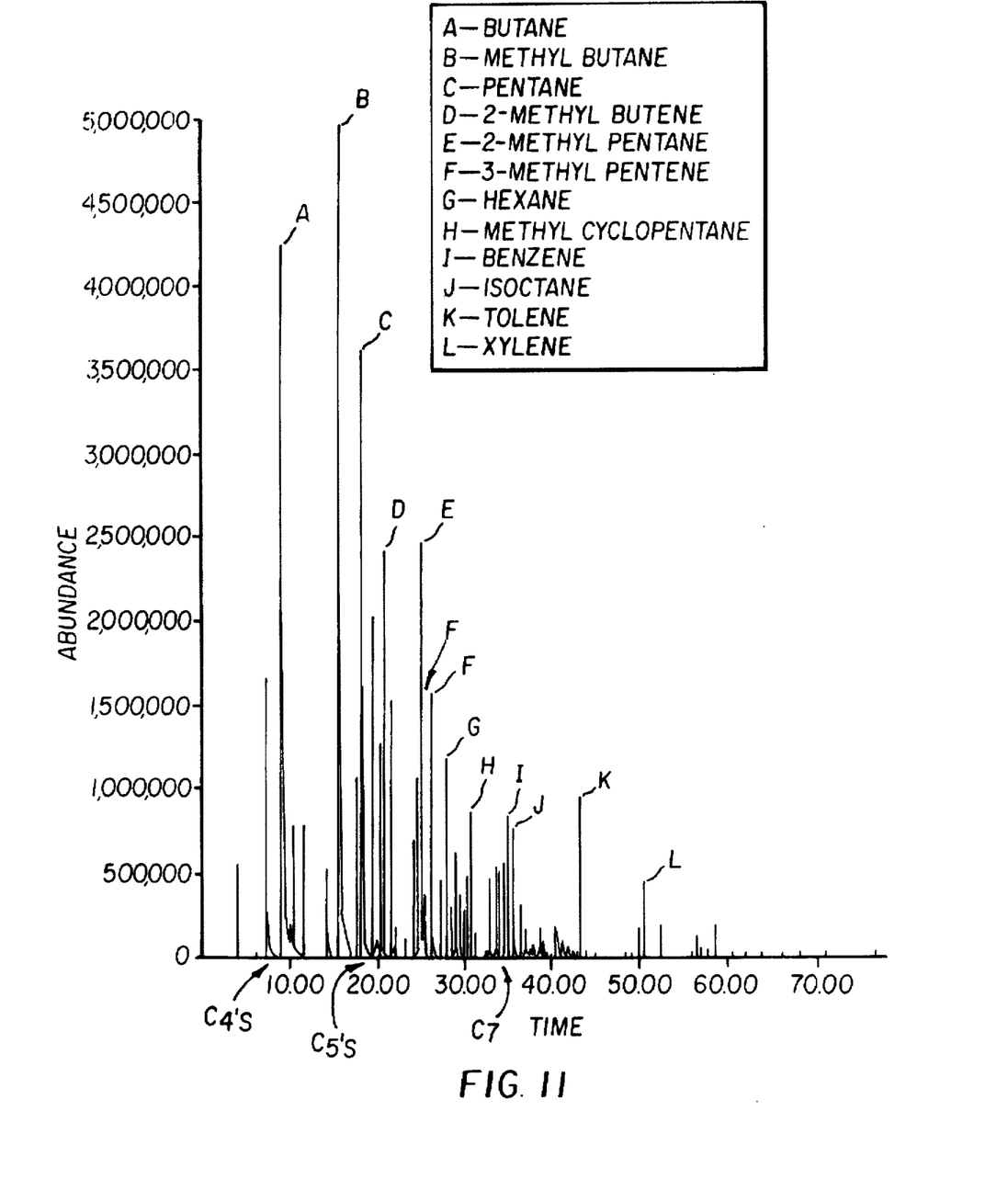
FIG. 11 is an ion chromatogram of untreated gasoline.
Figure 12:
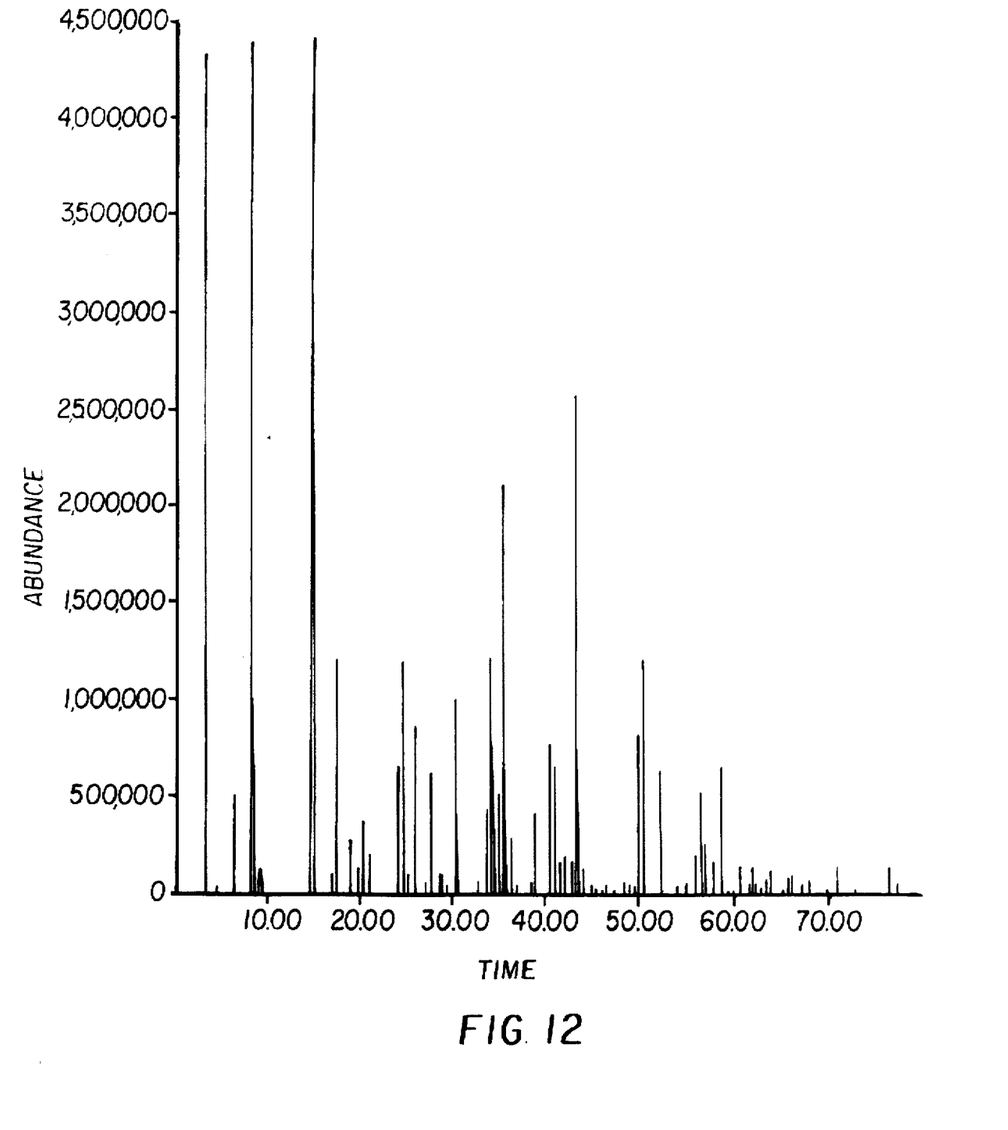
FIG. 12 is an ion chromatogram illustrating indolene treated with catalyst elements in accordance with the invention.
Figure 13:
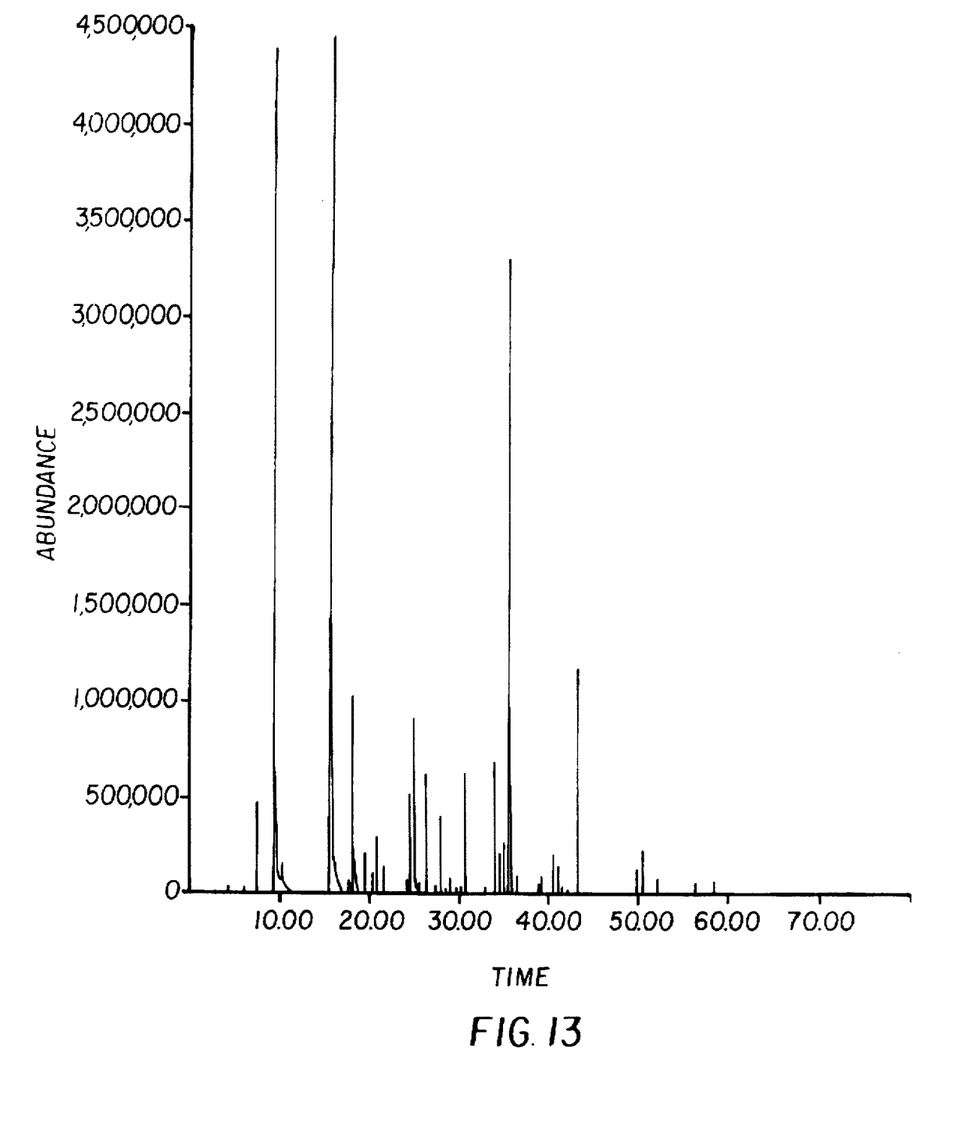
FIG. 13 is an ion chromatogram of untreated indolene.
Figure 18:
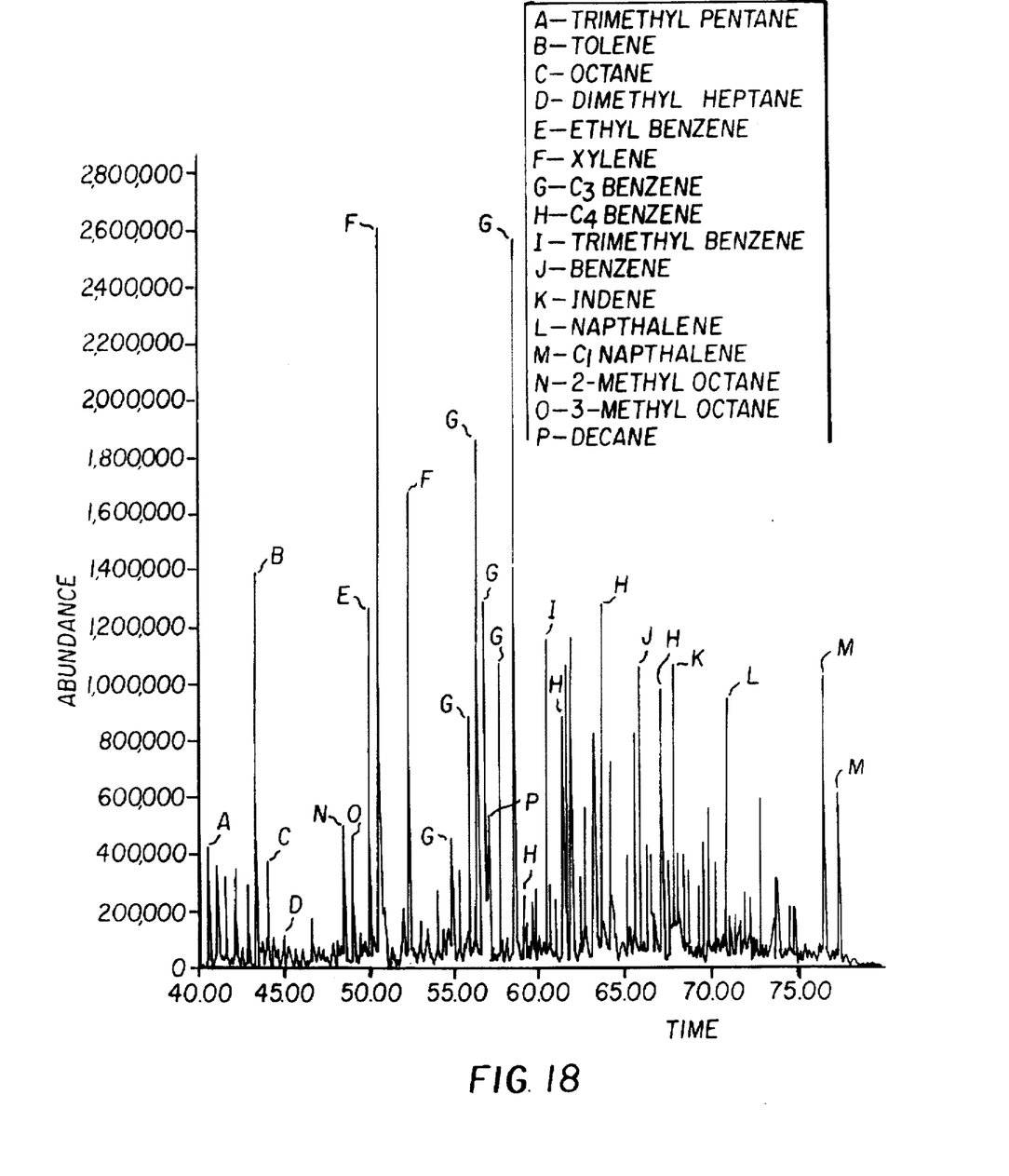
FIG. 18 shows an annotated chromatogram of the 40–80 minute portion of FIG. 10.
Figure 19A:
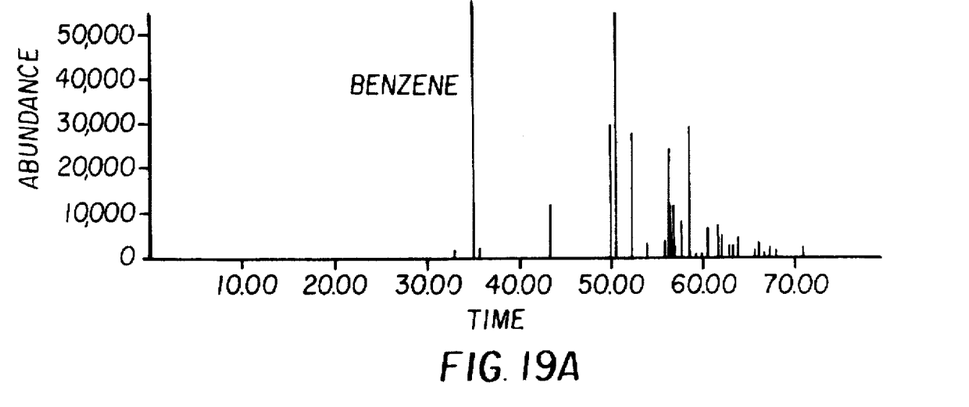
FIGS. 19A–19C show masses 77, 91, and 105, indicative of benzene, toluene, and xylene, respectively, for the treated indolene.
Figure 19B:
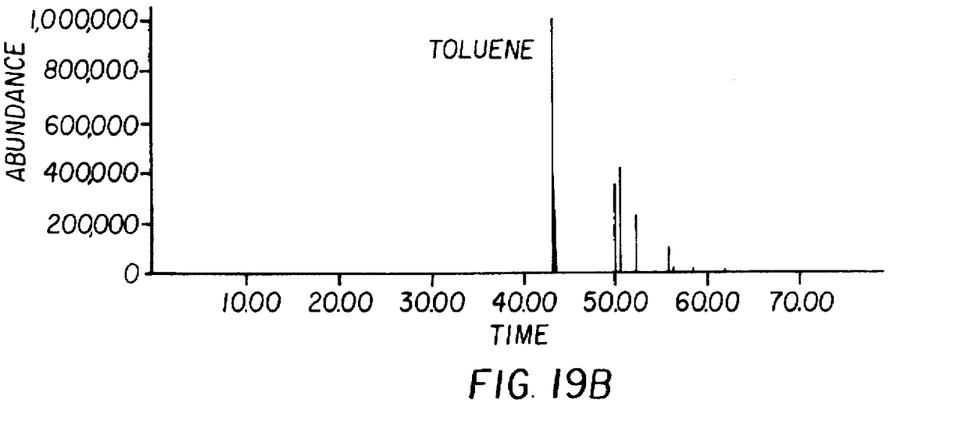
Figure 19C:
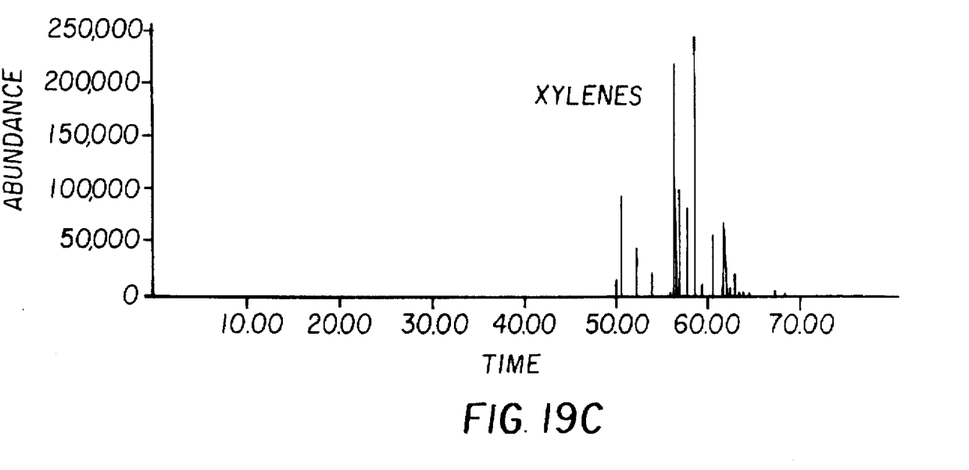
Figure 20A:
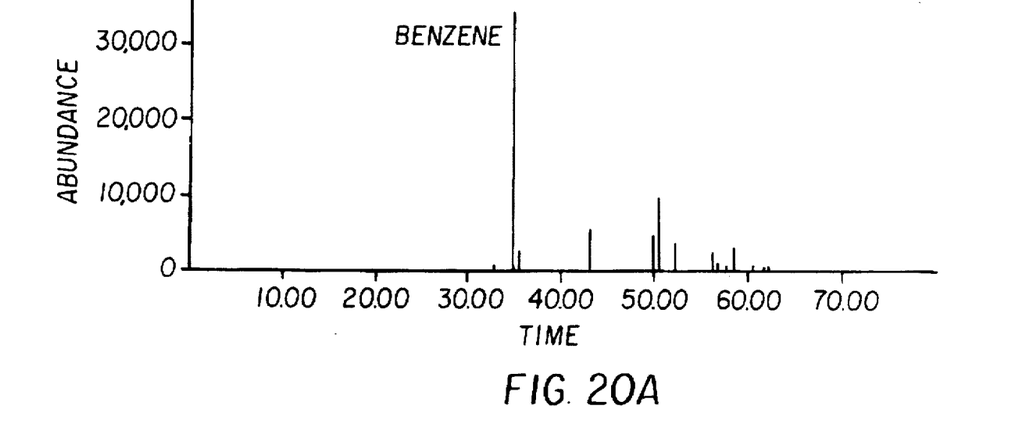
FIGS. 20A–20C show masses 77, 91, and 105, indicative of benzene, toluene, and xylene, respectively, for the untreated indolene.
Figure 20B:
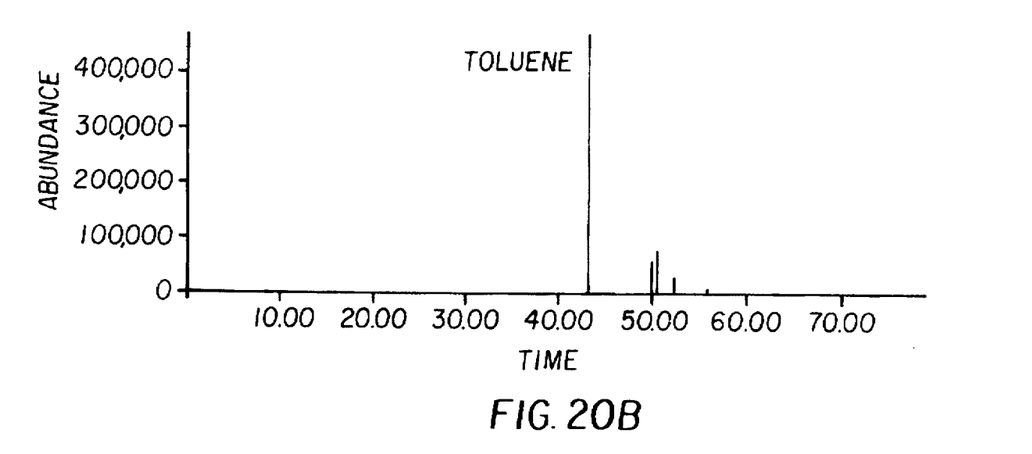
Figure 20C:
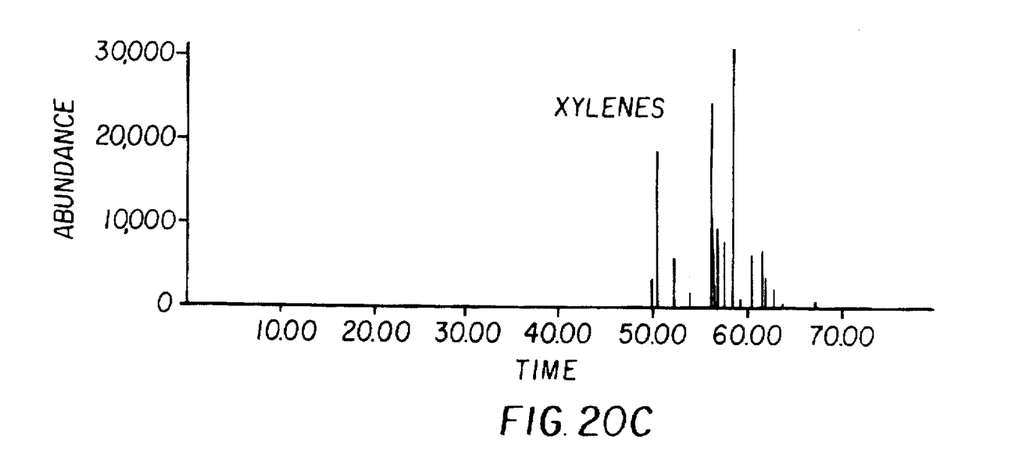

In the case of gasoline, most of the change was observed in the region of the chromatogram from 40 to 80 minutes. This region of the chromatogram is where the compounds which increase the octane of gasoline elute. Results for saturated alkanes are shown in FIGS. 16A–16C and 17A–17C. Only those compounds with mass 57, 71, and 85, masses indicative of alkanes, are shown in FIGS. 16A–16C and 17A–17C. The treated gasoline has many more of these compounds in the higher boiling portion of the chromatogram, indicating that the catalyst elements form these compounds, most likely by cracking longer chain paraffins. Accordingly, the treated gas has much more octane, nonane and decane than the untreated gas, which would mean higher octane. Furthermore, FIG. 18 shows an annotated chromatogram of the 40–80 minute portion of FIG. 10, the treated gasoline. Whereas FIG. 11 shows almost no compounds eluting in this region, there are many which were tentatively identified in FIG. 18. These compounds are mostly aromatic in nature, meaning they are based on benzene. Thus, FIG. 18 shows toluene (methyl benzene), the xylenes, ethyl benzenes, and various isomers of $C_3$-benzene and $C_4$-benzene. The aromatic hydrocarbons have the most energy per unit carbon, and thus have the highest octane rating, so the catalyst treatment appears to increase octane and energy content of the gasoline by forming aromatic compounds. Although the exact source of these compounds could not be determined from this initial experimental analysis, they are likely to derive from asphaltenes (high molecular weight tars) and other polycyclic aromatic which contaminate all commercial gasolines. Accordingly, the net effect of the treatment of the fuel by the elements appears to be the increase of high octane, high energy constituents in the gasoline.

Changes were also observed between the treated and untreated Indolene. FIGS. 19A–19C and 10A–20C show masses 77, 91, and 105, indicative of benzene, toluene, and xylene, respectively, for the treated and untreated indolene. The treated Indolene shows a much higher proportion of xylenes than the untreated fuel. It is believed that the $C_3$-benzenes and $C_4$-benzenes are being converted by the catalyst elements to these compounds.

Figure 14:
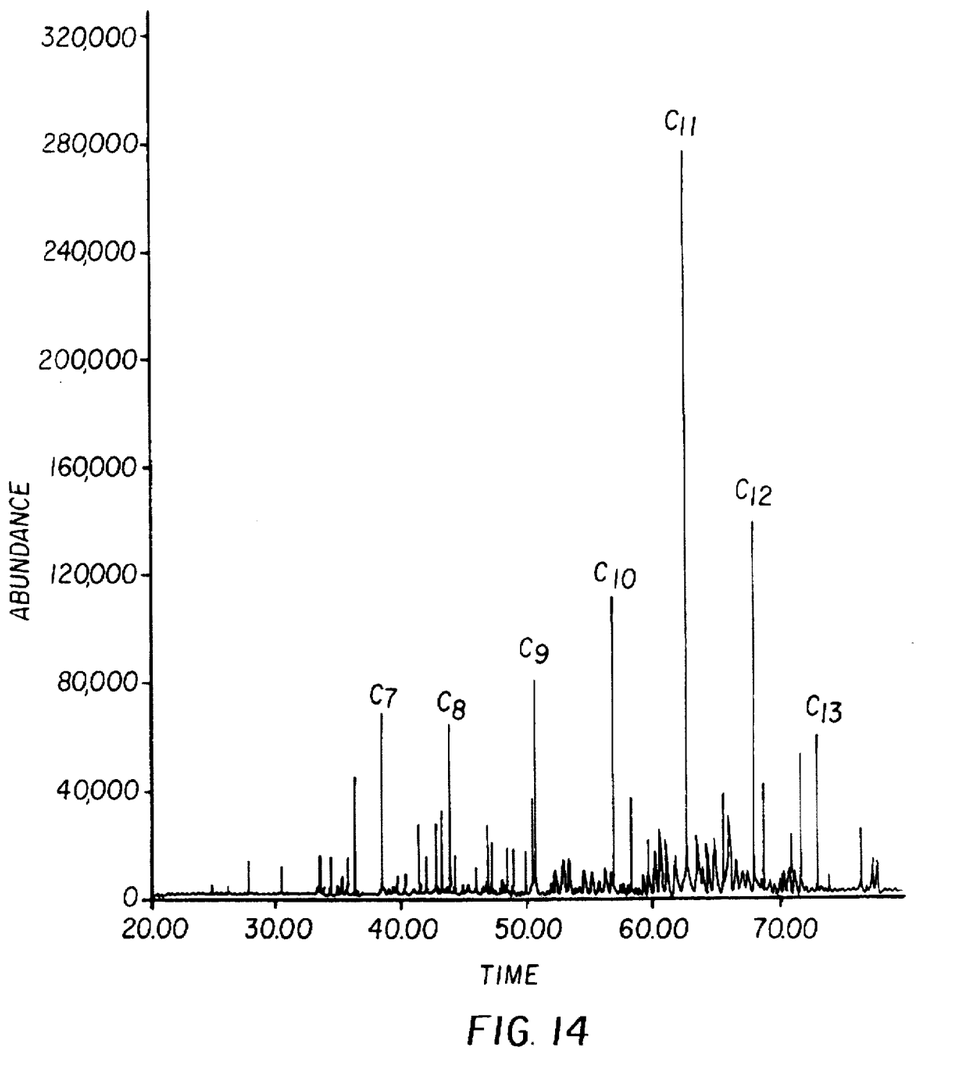
FIG. 14 is an ion chromatogram illustrating diesel fuel treated with catalyst elements in accordance with the invention.
Figure 15:
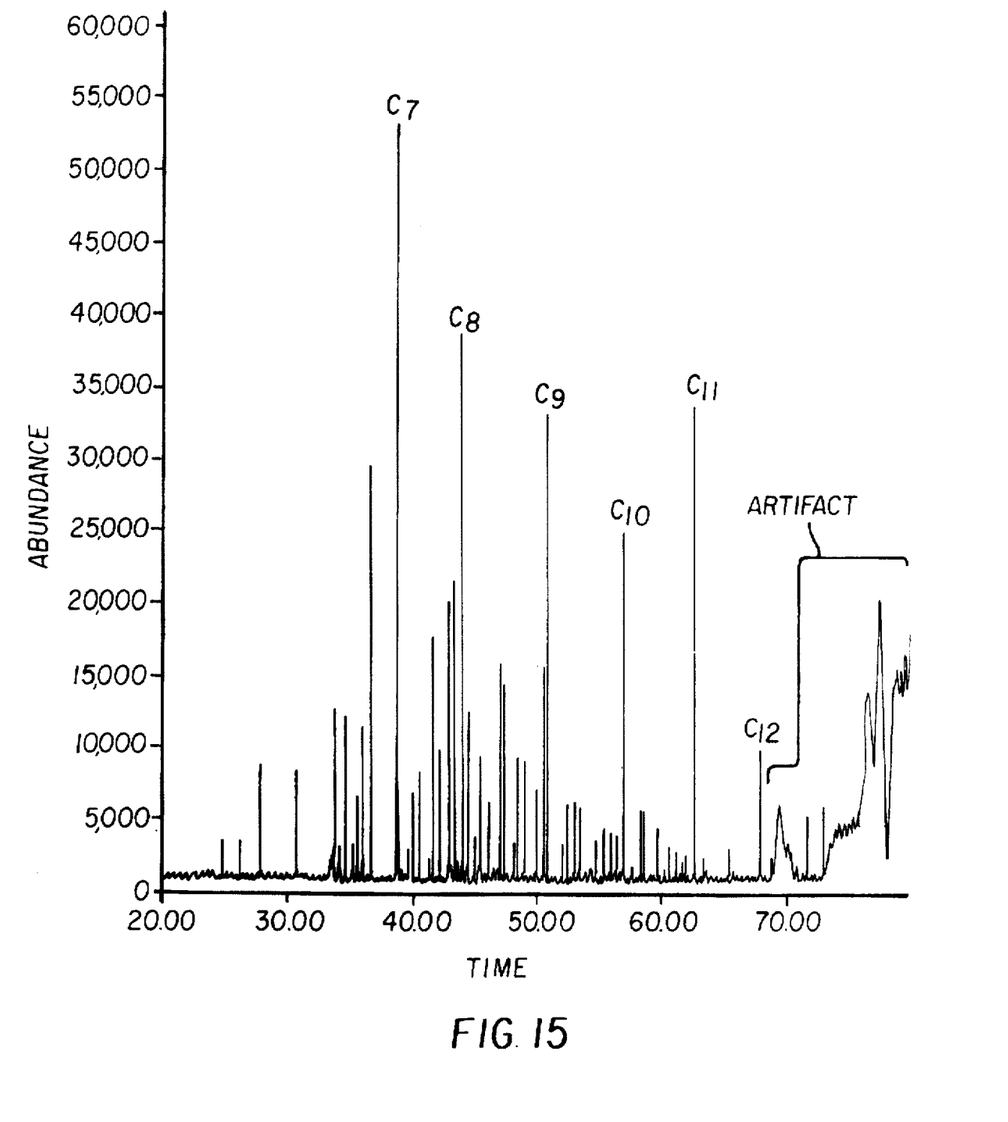
FIG. 15 is an ion chromatogram of untreated diesel fuel
Figure 16A:
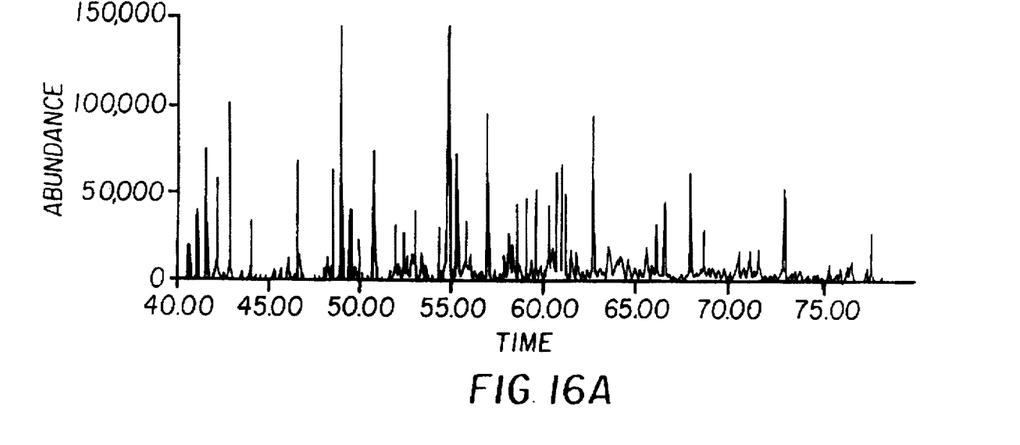
FIGS. 16A–16C illustrate an ion chromatogram for compounds with mass 57, 71, and 85 for treated gasoline.
Figure 16B:
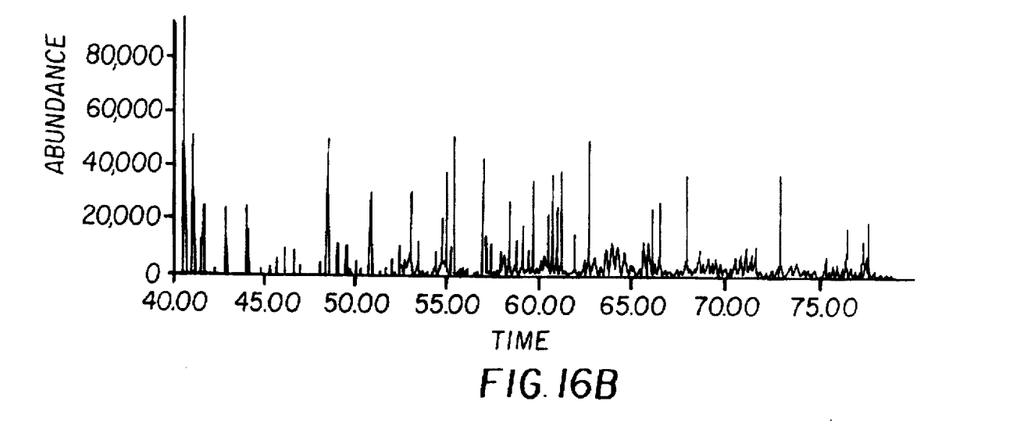
Figure 16C:
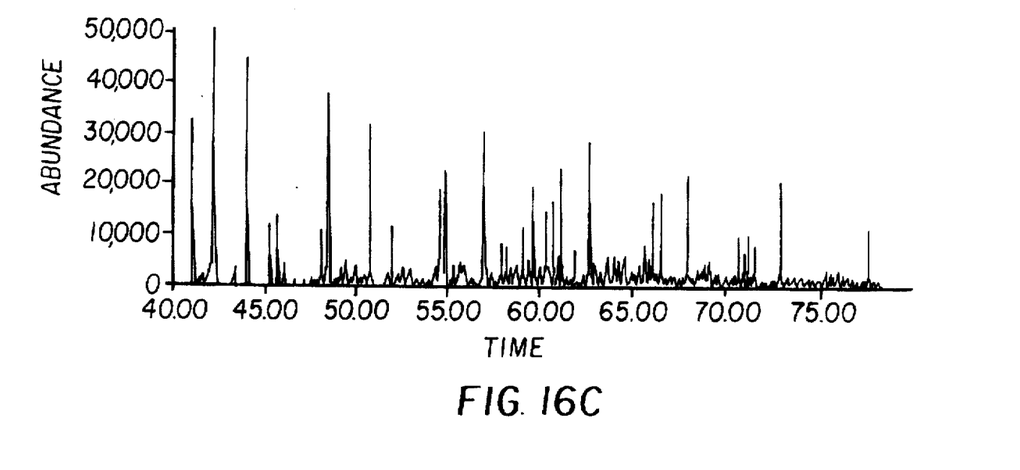
Figure 17A:
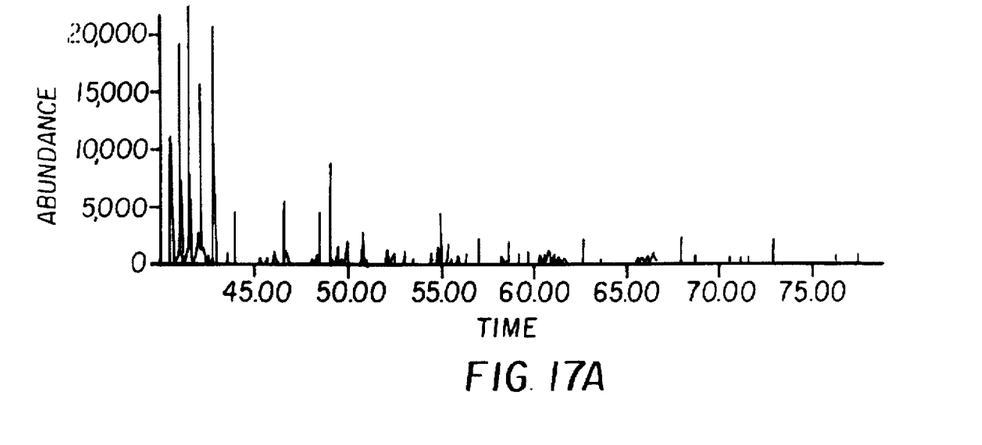
FIGS. 17A–17C illustrate an ion chromatogram for compounds with mass 57, 71, and 85 for untreated gasoline.
Figure 17B:
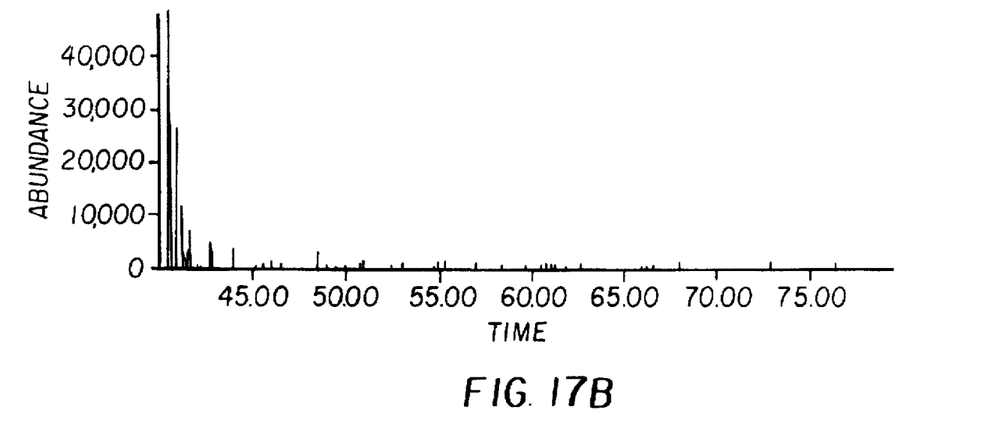
Figure 17C:
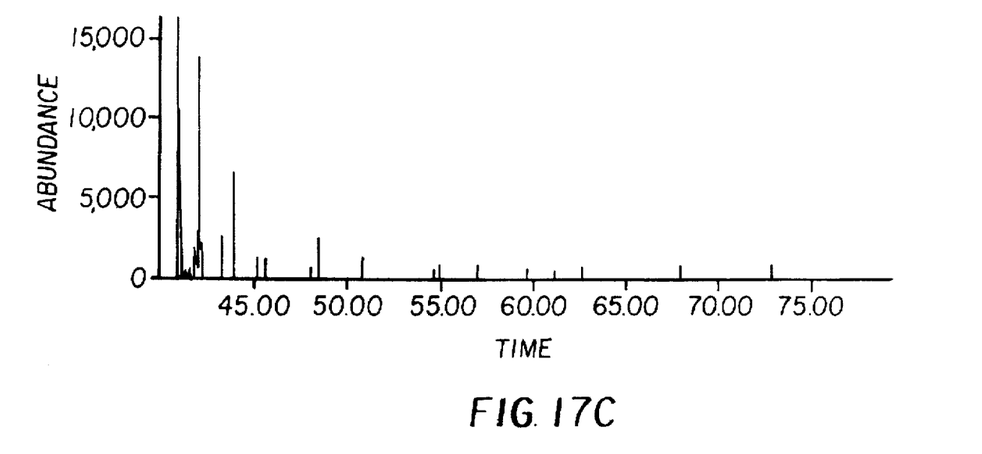

Diesel fuel is primarily made up of $C_8$ to $C_{18}$ saturated alkanes, with the bulk cut being between $C_{12}$ and $C_{16}$. The lighter ends lower the cetane number of diesel, and the heavier ends are not efficiently burned. FIGS. 14 and 16 are annotated to show the different C values. The addition of each carbon results in even spacing in time between peaks. The scale in FIG. 15 shows that the $C_7$, $C_8$, $C_9$ concentrations are about the same in the treated fuel illustrated in FIG. 14. The amount of $C_{10}$–$C_{12}$ is much greater in the treated fuel. Specifically an almost ten-fold increase is observed. Thus, it appears that the catalyst elements are cracking the long-chain paraffins to form the lower molecular weight saturated alkanes. Aromatics are generally not very abundant in diesel, so the aromatic derivatives that showed up in the gasoline are absent.

In addition to the above testing, fuel treatment devices in accordance with the invention have been certified by the United States Environmental Protection Agency as having satisfied all of the requirements of 40 C.F.R. §85.2114, based on tests conducted by various agencies which verified substantial decreases in hydrocarbon, carbon monoxide, oxides of nitrogen, carbon dioxide and fuel soot emissions. Further, tests conducted by the University of Pittsburgh Applied Research Center (Battery Technology Center) confirm that the elements 16 act as true catalysts and do not dissolve into the fuel being treated.

The invention has been described with reference to certain preferred embodiments thereof. It will be understood, however, that modifications and variations are possible within the scope of the appended claims. For example, the catalyst material can be formed into any desired shape for use within any desired type of housing. Alternatively, the catalyst material can be formed as a dry power or a semi-dry paste and poured directly into a steel fuel tank or formed as part of the fuel distribution system of a vehicle, burner, furnace or other combustion device. The housing or container retaining the elements may also be formed in any desired shape.

What is claimed is:

1. An apparatus for improving combustion efficiency comprising:

at least one catalyst element comprising tin, antimony, lead and mercury; and housing means for bringing fuel into contact with the catalyst element;

wherein the catalyst element comprises the following percentages by weight: 60–80% tin; 15–30% antimony; 2–7% lead; and 3–12% mercury.

2. An apparatus as claimed in claim 1, wherein the housing means comprises an in-line housing including a fuel inlet and a fuel outlet.

3. An apparatus as claimed in claim 2, wherein a plurality of elements are provided within the housing.

4. An apparatus as claimed in claim 3, wherein the plurality of elements are arranged in at least one of a straight line, multiple sets arranged in a straight line, and multiple levels.

5. An apparatus as claimed in claim 2, wherein the housing is substantially circular.

6. An apparatus as claimed in claim 1, wherein the housing means comprises a drop-in housing.

7. An apparatus as claimed in claim 6, wherein a plurality of elements are arranged in the drop-in housing.

8. An apparatus for improving combustion efficiency comprising:

at least one catalyst element comprising tin, antimony, lead and mercury; and housing means for brining fuel into contact with the catalyst element;

wherein the catalyst element comprises the following percentages by weight: 70–75% tin; 15–30% antimony; 2–7% lead; and 3–12% mercury.

9. An apparatus as chimed in claim 8, wherein the housing means comprises an in-line housing including a fuel inlet and a fuel outlet.

10. An apparatus as claimed in claim 9 wherein a plurality of elements are provided within the housing.

11. An apparatus as claimed in claim 10, wherein the plurality of elements are arranged in at least one of a straight line, multiple sets arranged in a straight line, and multiple levels.

12. An apparatus as claimed in claim 4, wherein the housing means comprises a drop-in housing.

13. An apparatus as claimed in claim 12, wherein a plurality of elements are arranged in the drop-in housing.

14. An apparatus for improving combustion efficiency comprising:

at least one catalyst element comprising tin, antimony, lead and mercury; and housing means for bringing fuel into contact with the catalyst element;

wherein the catalyst element comprises an alloy including approximately 75% wt tin, 21% wt antimony and 4% wt lead, wherein 0.5 kg of mercury and 0.020 kg platinum is added to 5.0 kg of the alloy.

15. An apparatus as claimed in claim 14, wherein the housing means comprises an in-line housing including a fuel inlet and a fuel outlet.

16. An apparatus as claimed in claim 15, wherein a plurality of elements are provided within the housing.

17. An apparatus as claimed in claim 16, wherein the plurality of elements are arranged in at least one of a straight line, multiple sets arranged in a straight line, and multiple levels.

18. An apparatus as claimed in claim 14, wherein the housing means comprises a drop-in housing.

19. An apparatus as claimed in claim 18, wherein a plurality of elements are arranged in the drop-in housing.

20. A method of manufacturing an element including a composition of 70 to 75% wt tin, 15 to 25% wt antimony, 2 to 4% wt lead and 3 to 7% wt mercury, comprising the steps of:

A) melting the tin, antimony and lead together in a mild steel pot to approximately 50 degrees Celsius above the melting temperature and stirring the resultant material for at least about three minutes using a mild steel rod or bar;

B) adding mercury, increasing the temperature a further 50 degrees Celsius to an upper temperature of 100 degrees Celsius, and stirring the resultant material for at least about two minutes after the upper temperature is reached; and C) pouring the resultant material, by use of a mild or stainless steel ladle, into molds formed of mild steel and pre-heated to a temperature sufficient to keep the material molten for at least about one second after pouring.

* * * * *